United States Patent Office 3,444,302
Patented May 13, 1969

3,444,302
METHOD OF PREVENTING INFLUENZA
VIRAL INFECTIONS
Charles G. Kormendy, Secane, Pa., assignor to Smith
Kline & French Laboratories, Philadelphia, Pa., a corporation of Pennsylvania
No Drawing. Filed Aug. 16, 1966, Ser. No. 572,674
Int. Cl. A61k 27/00; C07c 87/40
U.S. Cl. 424—325        13 Claims

ABSTRACT OF THE DISCLOSURE

2 - aminobicyclo[2.2.1]heptane, bicyclo[2.2.1]heptane-2 - methylamine, and α-methylbicyclo[2.2.1]heptane - 2-methylamine or their salts are formulated and administered to animals to combat influenza infections.

---

This invention relates to a method of ameliorating the effects of viral infections and a method of preventing viral infections. In particular, the invention relates to a method of ameliorating the effects of or preventing influenza infections comprising administering to an infected warm-blooded mammal or to such a mammal prior to infection a compound of Formula I or a pharmaceutically acceptable acid addition salt thereof.

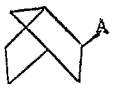

I where A is $NH_2$, $CH_2NH_2$, or

The compounds in which A is $NH_2$ or $CH_2NH_2$ are known compounds which are commercially available, but as far as the present inventor is aware, they have never been disclosed to possess antiviral activity. The compound where A is

is a new compound which is prepared by means of the oximation of the known bicyclo[2.2.1]hept-2-yl methyl ketone and subsequent reduction of the resulting oxime. This compound is part of the present invention.

The present compounds are active against influenza viruses, particularly influenza $A_2$, Ann Arbor strain and influenza A, swine strain, at doses of 25–100 mg./kg. They are administered either in the form of the free bases or, preferably, in the form of a pharmaceutically acceptable acid addition salt thereof. Among the preferred salts are the hydrochloride, hydrobromide, sulfate, and maleate. The 2-amino compound has been found to cause a 30–45% increase in survival of mice infected with influenza $A_2$, Ann Arbor strain, at subcutaneous doses of 100 mg./kg. The 2-methylamine compound causes a 35–80% increase in survival of mice infected with influenza $A_2$ at oral and subcutaneous doses of 25–100 mg./kg. and 30–75% increase in survival of mice infected with influenza A, swine strain, at oral and subcutaneous doses of 25–100 mg./kg.

The preferred routes of administration are orally in the form of a tablet or capsule and intranasally in the form of a 2–10% nasal spray or nose drops. The compounds are formulated for use in a manner well-known to pharmaceutical chemists, utilizing standard pharmaceutical excipients such as lactose, starch, terra alba, magnesium stearate, calcium sulfate, glyceryl mono or distearate, gelatin, or wax. The oral compositions may contain 50–500 mg. and may be administered either as one dose or in divided doses.

Representative compositions containing the antiviral compounds follow:

Tablet

|  | Mg. |
|---|---|
| Bicyclo[2.2.1]heptane - 2 - methylamine hydrochloride | 100 |
| Magnesium stearate | 2.5 |
| Starch | 15 |
| Terra alba | 150 |
| Granulate with syrup or 5% gelatin solution terra alba q.s. ad | 300 |

Capsule

|  | Mg. |
|---|---|
| α-methylbicyclo[2.2.1]heptane - 2-methylamine hydrochloride | 200 |
| Lactose, starch, or terra alba | 200 |

Nasal solution

|  | Percent w./v. |
|---|---|
| Bicyclo[2.2.1]heptane - 2-methylamine hydrochloride | [1] 6.4 |
| Eucalyptol, N.F. v./v. | 0.020 |
| Saccharin sodium | 0.050 |
| Thimerosal, N.F. | 0.001 |
| Potassium biphthalate | 0.130 |
| Sodium citrate | 0.200 |
| Purified water q.s. ad | 100.000 |

[1] Equivalent to 5% base.

α-Methylbicyclo[2.2.1]heptane-2-methylamine

A solution of 12.91 g. of $NH_2OH \cdot HCl$ and 20.6 g. of sodium acetate in 100 ml. of water is added to a solution of bicyclo[2.2.1]hept-2-yl methyl ketone [J. Am. Chem. Soc. 81, 4088 (1959)] in 100 ml. of ethanol. The solution is heated at reflux overnight, cooled, diluted with water, and extracted with ether. The solution is dried and evaporated in vacuo to give a liquid oxime residue, which partially solidifies on cooling; M.P. 85–89°.

Raney nickel alloy is added in 1 portion to a stirred solution of 1 g. of the oxime in a mixture of 20 ml. of ethanol and 20 ml. of 2 N NaOH. The mixture is stirred for 1 hour, filtered, and extracted with chloroform. Evaporation of the dried extracts gives the title amine. The amine is dissolved in ether and treated with ethereal HCl. The precipitated hydrochloride salt is purified by recrystallization from $CH_3CN$: M.P. 278° dec.

I claim:

1. A method of preventing influenza infections comprising administering to a warm-blooded mammal an effective, but nontoxic, amount of a compound of the structure

where A is $NH_2$, $CH_2NH_2$, or

or a pharmaceutically acceptable acid addition salt thereof.

2. A method as claimed in claim 1, where A is $CH_2NH_2$.
3. A method as claimed in claim 1, where A is

4. A method as claimed in claim 1, where A is $NH_2$.
5. A method as claimed in claim 1, where the compound is administered orally in the form of a tablet or capsule.

6. A method as claimed in claim 1, where the compound is administered intranasally.

7. An oral dosage unit in the form of a tablet or capsule for the prevention of influenza infections in warm-blooded mammals comprising 50–500 mg. of a compound as defined in claim 1 and a pharmaceutical carrier.

8. An oral dosage unit as claimed in claim 7, where A is $CH_2NH_2$.

9. An oral dosage unit as claimed in claim 7, where A is

10. An oral dosage unit as claimed in claim 7, where A is $NH_2$.

11. An intranasal composition for the prevention of influenza infections in warm-blooded mammals consisting of a 2–10% spray or drops comprising a compound as defined in claim 1 or a pharmaceutically acceptable acid addition salt thereof and purified water.

12. An intranasal composition as claimed in claim 11, where A is $CH_2NH_2$.

13. An intranasal composition as claimed in claim 11, where A is

References Cited

FOREIGN PATENTS 1,343,283  10/1963  France.
1,366,458  6/1964   France.

OTHER REFERENCES

Chemical Abstracts 57:5813 (1962) Copy in P.O.S.L.

FRANK CACCIAPAGLIA, JR., *Primary Examiner.*

J. GOLDBERG, *Assistant Examiner.*